United States Patent [19]
Phillips

[11] Patent Number: 5,223,126
[45] Date of Patent: Jun. 29, 1993

[54] SYSTEM FOR DECONTAMINATING DRY CLEANING WASTE WATER WITH CONTROLLED PUMPING

[75] Inventor: Alan J. Phillips, Santa Monica, Calif.

[73] Assignee: Air Quality Laboratories, Santa Monica, Calif.

[21] Appl. No.: 804,234

[22] Filed: Dec. 5, 1991

[51] Int. Cl.$^5$ .............................................. B01D 21/34
[52] U.S. Cl. ......................................... 210/86; 8/158;
    68/18 R; 210/96.1; 210/97; 210/180;
    210/257.1; 210/258; 210/259
[58] Field of Search ......................... 8/141, 142, 158;
    68/12.08, 12.09, 18 C, 18 F, 18 R, 18 D;
    210/85, 86, 96.1, 97, 101, 143, 167, 175, 182,
    258, 259, 295, 314, 513, 739, 744, 768, 774, 799,
    800, 804, 806, 180, 257.1, 104

[56] References Cited

U.S. PATENT DOCUMENTS

| | | | |
|---|---|---|---|
| 4,354,364 | 10/1982 | Holder et al. | 68/18 |
| 4,513,590 | 4/1985 | Fine | 68/18 |
| 4,637,232 | 1/1987 | Zucchini | 68/18 |
| 4,664,754 | 5/1987 | Caputi et al. | 210/182 |
| 4,954,222 | 9/1990 | Durr et al. | 202/176 |
| 5,076,936 | 12/1991 | Metz | 210/804 |
| 5,090,221 | 2/1992 | Sewter et al. | 68/18 F |

FOREIGN PATENT DOCUMENTS 3624087 1/1988 Fed. Rep. of Germany ...... 210/180

*Primary Examiner*—Joseph W. Drodge
*Attorney, Agent, or Firm*—Poms, Smith, Lande & Rose

[57] ABSTRACT

A system for decontaminating waste water produced during dry cleaning operations wherein the waste water contains dry cleaning solvent and particulate contaminants, the system comprising: a storage tank including an inlet through which the waste water is introduced into the storage tank and walls defining a settling chamber having a bottom sediment zone, wherein at least a portion of the dry cleaning solvent and particulate contaminants in the waste water settle by gravity to form a sediment in the sediment zone and provide partially decontaminated waste water which contains reduced amounts of the dry cleaning solvent and particulate contaminants; pump means for removing the partially decontaminated waste water from the settling chamber; particulate filter means for removing substantially all of the particulates remaining in the partially decontaminated waste water to provide particulate free waste water; solvent filter means for removing substantially all of the dry cleaning solvent remaining in the particulate free waste water to provide decontaminated waste water; and evaporator means for evaporating the decontaminated waste water.

9 Claims, 1 Drawing Sheet

SYSTEM FOR DECONTAMINATING DRY CLEANING WASTE WATER WITH CONTROLLED PUMPING

INTRODUCTION

Generally stated, the present invention relates to dry cleaning systems, and more particularly to a system and method for decontaminating dry cleaning waste water.

BACKGROUND OF THE INVENTION

In the typical dry cleaning process, a small amount of dry cleaning waste water is formed, generally consisting of a mixture of water and a dry cleaning solvent. The waste water also contains solid particulate matter, such as dirt or lint, which is often suspended in the mixture. Perchloroethylene is the most common dry cleaning solvent in commercial use today.

Traditionally, this waste water mixture was merely disposed of. However, it has become increasingly important that the water and solvent be separated, both for economic and environmental reasons. By reclaiming the solvent from the waste water, the solvent can be re-used in the dry cleaning process, reducing the operational cost of a dry cleaning establishment. Further, environmental considerations require that none of the solvent be permitted to be disposed into the environment.

Systems that reclaim solvent from dry cleaning waste water mixtures are known. For example, U.S. Pat. No. 4,637,232, entitled "Apparatus for the Recycling of Solvent Used in Dry-Cleaning Machines and Similar Equipment," issued to Zucchini, discloses a distillation apparatus which separates the solvent and water components. Zucchini discloses the use of a distillation chamber which vaporizes the azeotropic mixture of solvent and water, and produces a fluid which condenses to pure solvent. This solvent can then be drawn away for use in the dry cleaning process. The remaining waste water mixture is then repeated through the distillation apparatus, along with additional waste water generated by the dry cleaning process.

While Zucchini solves the problem of recycling the solvent, it raises new problems. First of all, the azeotropic mixture is highly corrosive due to the formation of hydrochloric (HCl) acid from the chloride solvent and water. This acidity is especially damaging to metallic components of the apparatus. Zucchini attempts to control this by keeping the mixture predominantly solvent. However, even trace amounts of HCl can damage the distillation chamber and tank. An additional problem is the disposal of the remaining water. Since solvent continues to remain in the mixture with water, the water cannot be safely disposed.

Other systems are known which can also purify the solvent from the waste water mixture, such as U.S. Pat. No. 4,513,590, entitled "Combination Filter Apparatus for Use with a Dry Cleaning Machine," issued to Fine, and U.S. Pat. No. 4,354,364, entitled "Dry-Cleaning System," issued to Holder et al. However, neither of these references provide an apparatus or method to purify the water from the waste water mixture.

Thus, it would be desirable to provide an apparatus which decontaminates the dry cleaning waste water mixture, resulting in both pure solvent and pure water. It would be further desirable to provide a method for decontaminating the dry cleaning waste water mixture, to be used in conjunction with such an apparatus.

SUMMARY OF THE INVENTION

Accordingly, a primary object of the present invention is to provide an apparatus which decontaminates the dry cleaning waste water mixture, resulting in both pure solvent and pure water. A further object of the present invention is to provide a method for decontaminating the dry cleaning waste water mixture, to be used in conjunction with such an apparatus.

Generally, the present invention provides a system for decontaminating waste water produced during dry cleaning operations wherein the waste water contains dry cleaning solvent and particulate contaminants. More specifically, the system comprises: a storage tank including an inlet through which the waste water is introduced into the storage tank and walls defining a settling chamber having a bottom sediment zone, wherein at least a portion of the dry cleaning solvent and particulate contaminants in the waste water settle by gravity to form a sediment in the sediment zone and provide partially decontaminated waste water which contains reduced amounts of the dry cleaning solvent and particulate contaminants; pump means for removing the partially decontaminated waste water from the settling chamber; particulate filter means for removing substantially all of the particulates remaining in the partially decontaminated waste water to provide particulate free waste water; solvent filter means for removing substantially all of the dry cleaning solvent remaining in the particulate free waste water to provide decontaminated waste water; and evaporator means for evaporating the decontaminated waste water.

A more complete understanding of the dry cleaning waste water decontamination system of the present invention will be afforded to those skilled in the art, as well as a realization of additional advantages and objects thereof, by a consideration of the following detailed description of a preferred exemplary embodiment. Reference will be made to the appended sheets of drawings which will be first described briefly.

DETAILED DESCRIPTION OF A PREFERRED EXEMPLARY EMBODIMENT

Figure 1:
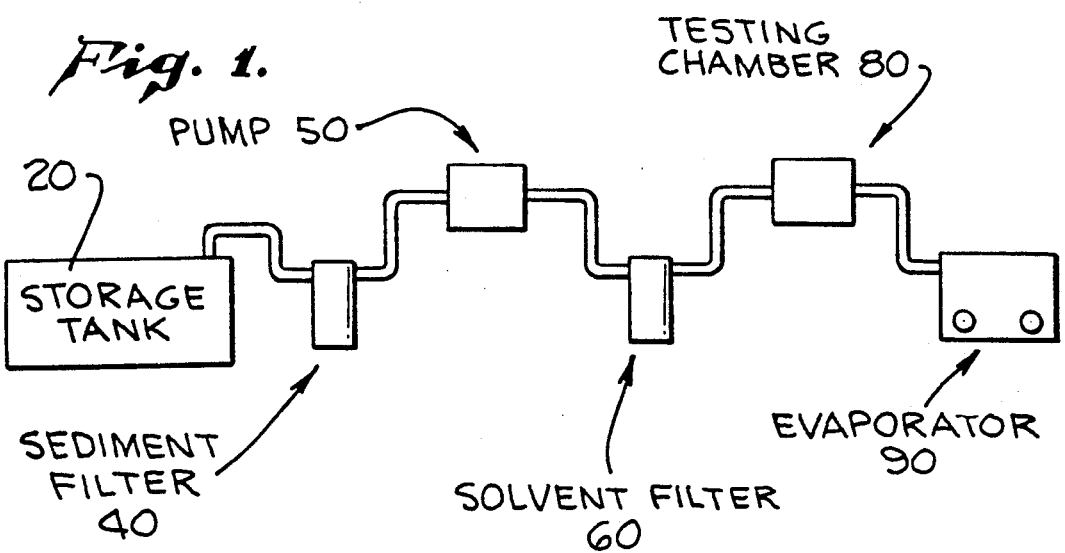
FIG. 1 shows a block diagram of the dry cleaning waste water decontamination system of the present invention.

In FIG. 1, there is show a block diagram of the system for decontaminating dry cleaning waste water according to the present invention. Dry cleaning waste water is first introduced into storage tank 20, in which the waste water is permitted to settle. Since the solvent is heavier than water, over a period of time, a portion of the dry cleaning solvent settles to the bottom of storage tank 20 due to gravity, with partially decontaminated waste water rising to the top. Pump means 50 draws the partially decontaminated waste water from the top of tank 20. As will be further described below, the solvent which settles to the bottom of storage tank 20 is drawn off for re-use in the dry cleaning process.

Next, particulate filter means 40 removes all solid particulates from the waste water which exits tank 20, producing particulate free waste water. Then, the particulate free waste water passes through solvent filter means 60, which removes all remaining dry cleaning solvent, yielding decontaminated waste water. Testing means 80 is provided for monitoring the level of dry cleaning solvent in the decontaminated waste water, to verify that all solvent has been removed by solvent filter means 60. Finally, evaporator means 90 evaporates the decontaminated waste water. The decontaminated waste water is heated to a boil, producing pure steam, which is then vented to the atmosphere. While the preferred dry cleaning solvent is perchloroethylene, it is anticipated that the present system for decontaminating dry cleaning waste water be utilized with any solvent commonly used in the dry cleaning industry.

Figure 2:
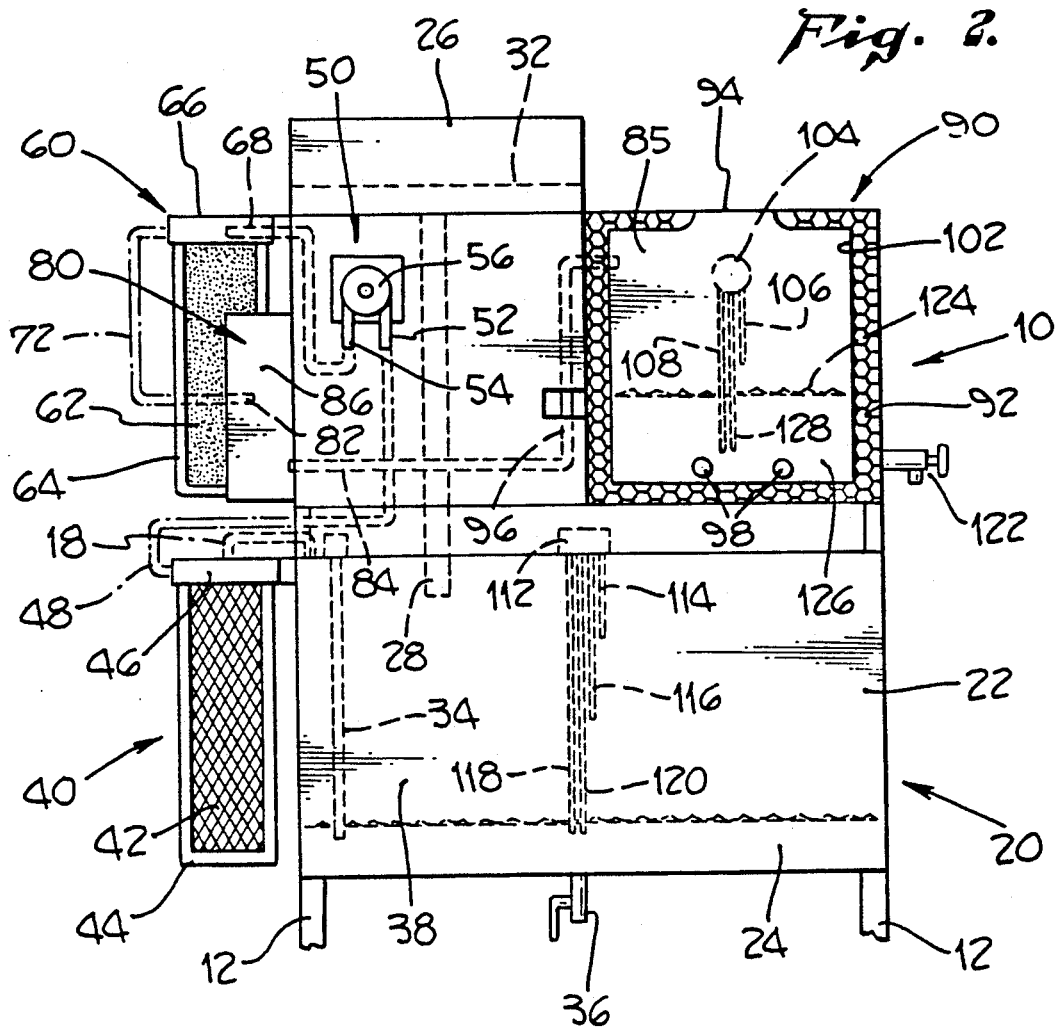
FIG. 2 shows an exemplary dry cleaning waste water decontamination system apparatus.

Referring now to FIG. 2, an exemplary apparatus 10 for decontaminating dry cleaning waste water is illustrated. Apparatus 10 comprises a substantially self contained unit having a cabinet structure 12, which is supported by legs 14. The cabinet structure 12 is exemplarily constructed of stainless steel. Stainless steel is preferred, since it is easy to clean and manufacture. For ease of inspection and replacement, certain components can be mounted externally of cabinet structure 12, as exemplarily shown in FIG. 2.

The lower portion of cabinet structure 12 contains storage tank 20. Funnel 26 is exposed at the upper portion of structure 12, which is connected by filler tube 28 to tank 20. Waste water introduced into funnel 26 flows through tube 28 to fill tank 20, where the waste water is stored for a period of time. The exemplary storage tank 20 has a capacity of 10.6 gallons. Inner walls 22 of storage tank 20 define a settling chamber 38 having bottom sediment zone 24.

Associated with storage tank 20 is a pre-filter means, which is provided for removing particulates prior to entry into storage tank 20. The pre-filter means comprises mesh screen 32 located in funnel 26 above filler tube 28. The exemplary mesh screen 32 is capable of removing particles having a size of about 100 mesh and greater. Waste water introduced into storage tank 20 through mesh screen 32 is allowed to settle by gravity, such that a portion of the dry cleaning solvent and particulate contaminants in the waste water form a sediment in the sediment zone 24. Simultaneously, partially decontaminated waste water containing reduced amounts of the dry cleaning solvent and particulate contaminants rise to the upper portion of tank 20.

To remove the sediment from the sediment zone 24, exhaust tube 34 is provided. Once the sediment has reached a maximum depth, the sediment can be pumped out from the storage tank through exhaust tube 34. This sediment can be re-used in the dry cleaning process, after screening out any particulate contaminants.

Next, particulate filter means 40 is provided for removing substantially all of the particulates remaining in the partially decontaminated waste water to provide particulate free waste water. The particulate filter means 40 comprises a particulate filter element 42 which is capable of removing substantially all solid particulates from the partially decontaminated waste water. Filter element 42 is housed within shell 44 having top cover 46. Waste water from storage tank 20 flows through pipe 18, entering particulate filter means 40 through top cover 46. The exemplary particulate filter element 42 is capable of removing particles having sizes greater than about 5 micron. As well known in the industry, the exemplary filter element 42 is intended to be periodically inspected and replaced, by disengaging the shell 44 from the top cover 46. Particulate free waste water exits particulate filter means 40 through pipe 48.

Downstream from particulate filter means 40 is pump means 50, which provides pressure for removing the partially decontaminated waste water from the settling chamber 38 through particulate filter means 40. The pump means 50 comprises pump chamber 56, intake pipe 52 and exhaust pipe 54. The exemplary pump chamber 56 is powered by 120 volts AC, and has a flow rate of approximately 4.75 gallons per hour. The particulate free waste water flowing out of particulate filter means 40 via pipe 48 enters pump means 50 through intake pipe 52. Then, the particulate free waste water is pushed past pump means 50 through exhaust pipe 54.

Solvent filter means 60 is provided for removing substantially all of the dry cleaning organic solvent remaining in the particulate free waste water to provide decontaminated waste water. The solvent filter means comprises a solvent filter element 62 which is capable of removing substantially all organic solvents from the particulate free waste water. Filter element 62 is housed within shell 64 having top cover 66. Particulate free waste water from pump means 50 flows through pipe 68, entering solvent filter means 60 through top cover 66. The exemplary solvent filter element 62 is formed of activated charcoal, and is capable of removing substantially all organic solvents, such as perchloroethylene, from the particulate free waste water. As well known in the industry, the exemplary filter element 62 is intended to be periodically inspected and replaced, by disengaging the shell 64 from the top cover 66. Decontaminated waste water exits solvent filter means 40 through pipe 72.

To insure that solvent filter means 60 is operating properly, testing means 80 is provided. Testing means 80 monitors the level of dry cleaning solvent in the decontaminated waste water. The exemplary testing means comprises testing chamber 86 connected between the solvent filter means 60 and the evaporator means 90, and is capable of identifying any remaining dry cleaning solvent in the decontaminated waste water. The decontaminated waste water from pipe 72 enters testing chamber 86 through intake pipe 82, where it is tested, then the decontaminated waste water exits through exhaust pipe 84. As will be further described below, the testing means 80 is electrically connected to the pump means 50, to stop the flow of waste water through the system if any solvent is discovered in the decontaminated waste water.

Finally, evaporator means 90 is provided for evaporating the decontaminated waste water. Evaporator means 90 comprises an evaporation tank 88 having internal walls 102 surrounding an internal evaporating chamber 124. The walls 102 are filled with an insulating material 92. Heating element 98 is disposed within evaporating chamber 124 adjacent to bottom portion 126. Vent 94 is provided at the top of evaporating chamber 124. Decontaminated waste water from testing means 80 enters evaporating chamber 124 through pipe 96. The exemplary heating element 98 is capable of slowly boiling the decontaminated waste water which is introduced into evaporating chamber 124, producing steam which is exhausted through vent 94. It should be clear that the corrosion problem faced by distillation systems disclosed in the prior art is avoided, since only water is being evaporated and not an azeotropic mixture.

To aid in cleaning the above described system, it is anticipated that storage tank clean out valve 36 and evaporator clean out valve 122 be provided. The valves 36 and 122 allow the operator to periodically clean the storage tank 20 and evaporator tank 88, respectively, to remove unwanted residue which would otherwise reduce the effectiveness of the system.

Monitoring of the operation of the exemplary system of the present invention is performed by a plurality of sensors. First, storage tank sensor 112 is provided, having solvent element 118, high water element 114, low water element 116 and ground element 120. Solvent element 118 and ground element 120 extend downward into sediment zone 24, and are of the same length. Ground element 120 forms a conductive path with each of high water element 114, low water element 116 and solvent element 118 when the elements are immersed in water. The solvent acts as an insulator to break the conductive path between solvent element 118 and low water element 116. Solvent element 118 is electrically connected to pump means 50 to disengage the pump once the sediment reaches a predetermined maximum depth and the conductive path between solvent element 118 and ground element 120 is broken. In the exemplary sediment zone, the maximum depth corresponds with a capacity of approximately 1.5 gallons of solvent. Before the pump means 50 can be started, the operator must pump the sediment from the sediment zone 24 through exhaust pipe 34.

The low water element 116 is electrically connected in series with solvent element 118 and ground element 120, and to pump means 50. The pump means 50 cannot be started unless all three elements are covered with waste water, and the sediment removed from sediment zone 24. Once the waste water level drops below low water element 116, indicating a minimum depth of waste water, the pump means 50 is disengaged, and the operator is alerted that additional waste water can be added to the system. The high water element 114 indicates that the tank 20 has reached a maximum depth of waste water. When the waste water reaches this maximum depth, an electrical connection is formed between ground element 120 and high water element 114, and an alarm sounds to alert the operator to preclude additional waste water from being added.

Similarly, the depth of decontaminated waste water in evaporation tank 88 is controlled by evaporator sensor 104, having upper element 106, lower element 108, and ground element 128. Evaporator sensor 104 is disposed within evaporating chamber 124, and is capable of shutting off heating element 98 and pump means 50 dependent on the level of decontaminated waste water in the evaporating chamber 124. Lower element 108 and ground element 128 are the same length. Upper element 106 of sensor 104 forms an electrical connection with ground element 128 when both elements are immersed in water. Pump means 50 is disengaged upon the level of decontaminated waste water reaching upper element 106, indicating a predetermined maximum depth. Lower element 108 also forms an electrical connection with ground element 128 when immersed in the decontaminated waste water, indicating that a predetermined minimum depth has been reached when this connection is broken. Once the decontaminated waste water reaches the predetermined minimum depth, heater element 98 disengages.

It is anticipated that the system further comprise an electronic circuit means to control and monitor operation of the system elements. The electronic circuit means is electrically connected to testing means 80, storage tank sensor 112 and evaporator sensor 104, to receive the maximum and minimum depth signals described above. Also, testing chamber 86 produces an emergency signal to disengage the pump means 50 upon discovery of any solvent downstream from the solvent filter means 60. The electronic circuit means would then energize pump means 50 and heating element 98 in accordance with these signals. It is further anticipated that the electronic circuit means provide both audible means and visual means of alerting the operator upon receipt of signals from either storage tank sensor 112 or evaporator sensor 104. The audible means could comprise a horn or siren. The visual means could comprise lights or light emitting diodes (LEDs).

In conjunction with the above described system, the present invention further comprises a method for decontaminating waste water produced during dry cleaning operations wherein the waste water contains dry cleaning solvent and particulate contaminants. The method comprising the steps of: introducing the waste water into a storage tank having an inlet and walls defining a settling chamber having a bottom sediment zone, wherein at least a portion of the dry cleaning solvent and particulate contaminants in the waste water settle by gravity to form a sediment in the sediment zone and provide partially decontaminated waste water which contains reduced amounts of dry cleaning solvent and particulate contaminants; removing the partially decontaminated waste water from said settling chamber by use of a pump; removing substantially all of the particulate contaminants remaining in the partially decontaminated waste water by use of a particulate filter to provide particulate free waste water; removing substantially all of the dry cleaning solvent remaining in the particulate free waste water by use of a solvent filter to provide decontaminated waste water; and evaporating the decontaminated waste water.

The above method further comprises the step of removing the sediment from the sediment zone. In addition, the method can also include the step of removing particulates from said waste water prior to entry into said storage tank. Finally, the method can also include the step of testing the decontaminated waste water for the presence of any remaining dry cleaning solvent in the decontaminated waste water.

Having thus described a preferred exemplary embodiment of a system and method for decontaminating waste water produced during dry cleaning operations, it should now be apparent to those skilled in the art that the aforestated objects and advantages for the within system have been achieved. It should also be appreciated by those skilled in the art that various modifications, adaptations and alternative embodiments thereof may be made within the scope and spirit of the present invention which is defined by the following claims.

What is claimed is:

1. A system adapted for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, wherein at least a portion of said dry cleaning solvent and particulate contaminants in said waste water settle by gravity to form a sediment in said sediment zone and provide partially decontaminated waste water which contains reduced amounts of said dry cleaning solvent and particulate contaminants;

pump means for removing said partially decontaminated waste water from said settling chamber;

particulate filter means for removing substantially all of the particulate contaminants remaining in said partially decontaminated waste water to provide particulate free waste water;

solvent filter means for removing substantially all of the dry cleaning solvent remaining in said particulate free waste water to provide decontaminated waste water;

evaporator means for evaporating said decontaminated waste water; and wherein said pump means comprises a peristaltic pump located between said particulate filter means and said solvent filter means.

2. A system for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, wherein at least a portion of said dry cleaning solvent and particulate contaminants in said waste water settle by gravity to form a sediment in said sediment zone and provide partially decontaminated waste water which contains reduced amounts of said dry cleaning solvent and particulate contaminants;

pump means for removing said partially decontaminated waste water from said settling chamber;

particulate filter means for removing substantially all the particulate contaminants remaining in said partially decontaminated waste water to provide particulate free waste water;

solvent filter means for removing substantially all the dry cleaning solvent remaining in said particulate free waste water to provide decontaminated waste water;

evaporator means for evaporating said decontaminated waste water, said evaporator means comprises an evaporation tank having insulated walls surrounding an internal evaporating chamber, a heating element disposed within said evaporating chamber at a bottom portion thereof, and a vent at the top of said evaporating chamber, said heating element capable of boiling said decontaminated waste water which is introduced into said evaporating chamber, further producing steam which is exhausted through said vent;

testing means for monitoring the level of dry cleaning solvent in said decontaminated waste water, said testing means comprises a testing chamber located between said solvent filter means and said evaporator means, said testing chamber capable of identifying any remaining dry cleaning solvent in said decontaminated waste water; and termination means for terminating operation of said pump means and said evaporator means, said termination means having a logic circuit capable of stopping said pump means and said evaporator means if said dry cleaning solvent is identified by said testing means.

3. A system for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, wherein at least a portion of said dry cleaning solvent and particulate contaminants in said waste water settle by gravity to form a sediment in said sediment zone and provide partially decontaminated waste water which contains reduced amounts of said dry cleaning solvent and particulate contaminants;

pump means for removing said partially decontaminated waste water from said settling chamber;

particulate filter means for removing substantially all the particulate contaminants remaining in said partially decontaminated waste water to provide particulate free waste water;

solvent filter means for removing substantially all the dry cleaning solvent remaining in said particulate free waste water to provide decontaminated waste water;

evaporator means for evaporating said decontaminated waste water;

means for removing said sediment from said sediment zone; and storage tank sensor means for sensing the level flow of said waste water in said storage tank and, in response, controlling said pump means.

4. A system for decontaminating waste water according to claim 3 wherein said storage tank sensing means further comprises means for detecting the presence of a predetermined maximum amount of sediment in said sediment zone, and for disengaging said pump means upon said sediment reaching said predetermined maximum amount.

5. A system for decontaminating waste water according to claim 3 wherein said storage tank sensor means further comprises means for detecting the presence of a maximum amount of waste water in said storage tank, and for alerting an operator upon said waste water reaching said predetermined maximum amount.

6. A system for decontaminating waste water according to claim 3 wherein said storage tank sensor means further comprises means for detecting the presence of a predetermined minimum amount of said waste water in said storage tank, and for disengaging said pump means upon said waste water dropping below said predetermined minimum amount.

7. A system for decontaminating waste water produced during dry cleaning operations containing dry cleaning solvent and particulate contaminants, said system comprising:

a storage tank including an inlet through which said waste water is introduced into said storage tank and walls defining a settling chamber having a bottom sediment zone, wherein at least a portion of said dry cleaning solvent and particulate contaminants in said waste water settle by gravity to form a sediment in said sediment zone and provide partially decontaminated waste water which contains reduced amounts of said dry cleaning solvent and particulate contaminants;

pump means for removing said partially decontaminated waste water from said settling chamber;

particulate filter means for removing substantially all of the particulate contaminants remaining in said partially decontaminated waste water to provide particulate free waste water;

solvent filter means for removing substantially all the dry cleaning solvent remaining in said particulate free waste water to provide decontaminated waste water;

evaporator means for evaporating said decontaminated waste water, said evaporator means comprises an evaporation tank having insulated walls surrounding an internal evaporating chamber, a heating element disposed within said evaporating chamber at a bottom portion thereof, and a vent at the top of said evaporating chamber, said heating element capable of boiling said decontaminated waste water which is introduced into said evaporating chamber, further producing steam which is exhausted through said vent; and evaporator sensor means for sensing the level of said decontaminated waste water in said evaporation tank and, in response, controlling said pump means.

8. A system for decontaminating waste water according to claim 7 wherein said evaporator sensor means further comprises means for detecting the presence of a predetermined maximum depth of said decontaminated waste water in said evaporating tank, and for disengaging said pump means upon said decontaminated waste water reaching said predetermined maximum depth.

9. A system for decontaminating waste water according to claim 7 wherein said evaporator sensor means further comprises means for detecting the presence of a predetermined minimum depth of said decontaminated waste water in said evaporating tank, and for disengaging said heating element upon said decontaminated waste water dropping below said predetermined minimum depth.

* * * * *